United States Patent [19]
Moore et al.

[11] 3,983,020
[45] Sept. 28, 1976

[54] ISOTOPIC SEPARATION BY PHOTOPREDISSOCIATION

[75] Inventors: C. Bradley Moore, Berkeley, Calif.; Edward S. Yeung, Ames, Iowa

[73] Assignee: The Regents of the University of California, Berkeley, Calif.

[22] Filed: Jan. 26, 1973

[21] Appl. No.: 326,833

[52] U.S. Cl. .................. 204/157.1 R; 204/158 R; 204/DIG. 11; 55/2
[51] Int. Cl.² .......................... B01J 1/10
[58] Field of Search ............ 204/158 R, 157.1 R; 55/2, 3

[56] References Cited
UNITED STATES PATENTS

| | | | |
|---|---|---|---|
| 3,443,087 | 5/1969 | Robieux et al. | 204/157.1 R |
| 3,673,406 | 6/1972 | Nief et al. | 204/193 |

FOREIGN PATENTS OR APPLICATIONS

| | | | |
|---|---|---|---|
| 1,959,767 | 11/1969 | Germany | 204/157.1 R |
| 1,284,620 | 8/1972 | United Kingdom | 204/157.1 R |

OTHER PUBLICATIONS

Mayer et al., Applied Physics Letters, vol. 17, No. 12, (15 Dec. 1970), pp. 516–519.

*Primary Examiner*—Howard S. Williams
*Attorney, Agent, or Firm*—Owen, Wickersham & Erickson

[57] ABSTRACT

A monochromatic source excites individual isotopic lines in a well-resolved absorption spectrum for which the upper state is predissociated. Isotopic enrichment is thus achieved in the dissociation products, which may be stable molecules or may be chemically trapped if they are reactive. As an example, isotopic separation of hydrogen and deuterium is performed by exciting formaldehyde with a frequency-doubled ruby laser.

17 Claims, 1 Drawing Figure

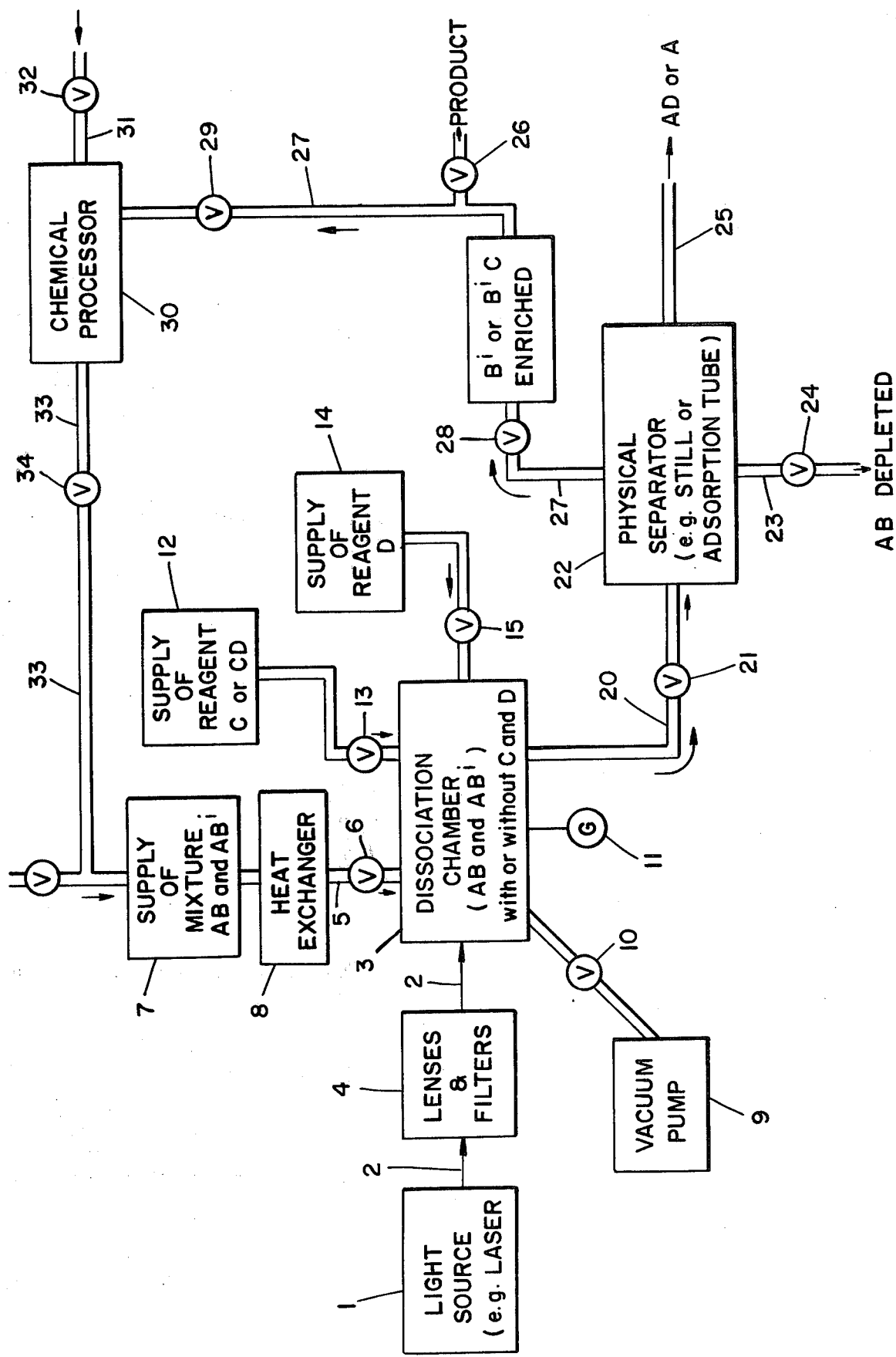

ISOTOPIC SEPARATION BY PHOTOPREDISSOCIATION

BACKGROUND OF THE INVENTION

Isotopic separation has been done in various manners, including fractional distillation, mass spectroscopy, and selective light absorption.

Isotope separation using lasers could produce large reductions in the cost of isotope production.

The use of lasers in isotopic separation has previously been attempted in methanol and in $Br_2$. However, the kinetics of the prior-art systems were too complicated for clear interpretation of the results, or for the processes to be useful in actual production.

The essential ingredients for a scheme of isotope separation by lasers are:

1. An absorption spectrum with a well-resolved isotope shift,
2. A laser significantly monochromatic and tunable to excite the absorption of one isotope and not the other,
3. A chemical or physical process which acts on excited molecules and separates them from unexcited ones but need not have any inherent isotopic selectively, and
4. A set of photochemical rate constants and physical conditions such that energy transfer from a laser-excited species to an undesired species does not occur before the separation in ingredient (3) above.

These essential ingredients have been absent from the prior art. One purpose of the present invention is to render isotope separation by lasers and also similar photo-excitation feasible.

Some orders of magnitude may help to show that laser separation could have a revolutionary effect on isotope costs. Present isotope prices generally run between one hundred dollars and one hundred thousand dollars per mole. The power costs of using a laser method for separation would run about three dollars per mole, based on an assumption of a laser efficiency of $10^{-3}$ and employing that in a process yielding one separated atom for each 3300 A photon absorbed, which requires about one-tenth of one kilowatt hour of light per mole of product. Even though the power cost is not the total cost, nevertheless the differential is remarkable.

SUMMARY OF THE INVENTION

In this invention, isotopic separation is achieved directly by photoexcitation, especially by a laser. A general separation scheme is the selective excitation of isotopic spectral lines in a region of weak predissociation. In such a spectrum, lines are sharp enough to resolve various isotopic molecules even though the excited state decays by dissociation. Excitation of a single absorption line yields isotopically pure dissociation products.

The invention works with chemical compounds in which one element is present in a plurality of isotopes and where there are sharp spectral lines that produce dissociation of the compound with one isotope but do not affect the compound with another isotope.

Thus, the generalized equation is
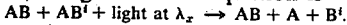
A and $B^i$ may be stable molecules, or there may be present another chemical C such that
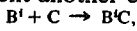
which is stable.

The chemical change resulting from dissociation enables segregation of the isotope or compound containing it from the other materials by known methods of product separation, such as by distillation, crystallization, or chromatography.

The rotational and vibrational energies of molecules decrease with increasing nuclear mass. The rotational envelopes of vibrational bands are on the order of 10–100 $cm^{-1}$ broad. Deuterium substitution will shift vibrational frequencies beyond this envelope. In some cases isotopic substitutions of elements lithium through oxygen may do the same. Usually the vibration-rotation bands of an isotopically substituted molecule will overlap those of the abundant molecule, and it is necessary to select among interspersed vibration-rotation lines. For this purpose, small linear or symmetric top molecules are to be preferred. Spectra for excited electronic states are usually more difficult to excite selectively but offer more possibilities for the subsequent separation.

Isotope shifts are readily observable in solids, particularly when the absorber is dilute in a host or matrix. Usually rotational motion is frozen out, and a single absorption line appears for each vibrational state. Line widths of infrared absorption spectra in matrices are often less than 1 $cm^{-1}$ and allow isotope shift of atoms as heavy as bromine to be observed. Electronic spectral line widths are more capricious. However, sharp spectra are observed. An isotope shift has even been resolved for an uranium compound, $UO_2cl_2$, at 4489 A.

Brief Description of the Drawing

The drawing is a flow sheet of the process of the invention.

Description of some Preferred Embodiments

The drawing will be described in connection with a continuous process; although, of course, batch processes are equally feasible.

A light source 1 sends a monochromatic light beam 2 to a dissociation chamber 3. The light source 1 may be a laser or other source of monochromatic light, including filtered white light or other filtered continuum. It may be infrared or ultraviolet or visible. A laser is generally preferred. Lenses or filters 4 may be interposed in the beam 2 for collimation, removing unwanted spectral bands, etc. For example, the filter 4 may be an isotropically depleted sample of the material to be dissociated.

In the dissociation chamber 3, the beam 2 strikes and is absorbed by a stream 5 of material containing at least two different isotopes of one element in chemical combination--e.g., AB and $AB^i$. The chamber may contain mirrors for multiple reflection of the excitation beam. The stream 5 may comprise nothing else--e.g., $(AB + AB^i)$ introduced through a valve 6 from a supply 7 of the material via a heat exchanger 8 to give a desired temperature. A vacuum pump 9, connected to the chamber 3 via a valve 10, produces the desired gas pressure within the chamber 3, as indicated by a gauge 11. Depending on the type of reaction involved, other elements or compounds may also be introduced to the chamber 3, as, for example, a reagent C that is to combine with the free isotope $B^i$ after its liberation from $AB^i$. Thus, there may be a reagent supply 12 and valve 13 for that element; and in some instances another reagent supply 14 and valve 15.

The actual mechanism of dissociation in the dissociation cell or chamber 3 may take any of several forms. In all forms the desired isotopic molecule is selectively excited by light. Which form is used will depend in part on the material being worked with, since some materials when excited will dissociate spontaneously such that no special additional mechanism will be required, while others will require an additional mechanism. Thus, in the easiest examples there will be a spontaneous predissociation of the molecules containing the desired isotope, whereas in other instances there will have to be an additional step. Then the dissociation of the excited molecule can be induced by an electric field in the chamber 3 or in a magnetic field in the chamber 3, or the dissociation may be induced by collision with other molecules that are in the chamber.

The molecules to be excited may be frozen in a solid, and the dissociation products may be stable in this frozen state in the solid. The dissociaton products may also be chemically trapped by molecules of the surrounding solid in cases where they are not stable themselves within the solid. The range of temperatures and pressures is thus very wide; and, while in any particular instance there may be some criticality of either temperature or pressure or both, it is not a critical necessity of the invention in its broad aspects.

As a result of the impingement of the light beam 2 on the stream 5, there is dissociation (e.g., $AB + AB^i + h\nu \rightarrow AB + B^i + A$) and possible new combination (e.g., $AB + B^i + A + C + D \rightarrow AB + BC^i + AD$). An outgoing stream 20 goes via a valve 21 to a physical separator 22. The separator 22 may be a still for fractional distillation, or an absorption tube or a chromatograph.

Various products may be removed, several of which may be useful, such as the AB depleted material withdrawn at line 23 and valve 24 and the stream A or AD at line 25. A line 27 may carry material richer in $B^i$ than the original material at 7 via valves 28 and 29 to a chemical processor 30, or enriched product may be withdrawn through valve 26. In the chemical processor, a reagent stream 31 may be added through a valve 32 to convert the partially enriched $B^i$ to $AB^i$. This $AB^i$ in stream 33 may be sent via a valve 34 to the supply 7 for a second run through the chamber 3.

Laser Excitation of Formaldehyde

Gaseous formaldehyde may be used in an example. The near-uv $\eta$-$\pi^*$ transition is to the first excited singlet state and has a well-resolved absorption spectrum. This state is predissociated by mixing with the high vibrational levels of the ground singlet state and gives dissociation products of $H_2$ and CO with near-unity quantum efficiency. The kinetic scheme is reasonably simple and is represented as follows:

$H_2CO(S_o) + h\nu \rightarrow H_2CO(S_1)$ (excitation), $H_2CO(S_1) \rightarrow H_2 + CO$ (molecular predissociation),   (1)
$H_2CO(S_1) \rightarrow H + HCO$ (radical predissociation),   (2)
$H + H_2CO(S_o) \rightarrow H_2 + HCO$ (abstraction),   (3)
$H_2CO(S_1) + M \rightarrow H_2 + CO + M$ (collision-induced dissociation).   (4)

It is clear that $C^{13}O$-, $C^{14}O$-, $CO^{17}$ and $CO^{18}$-enriched samples can be obtained by selectively exciting spectral lines of $H_2C^{13}O$, $H_2C^{14}O$, $H_2CO^{17}$ and $H_2CO^{18}$, respectively, if reaction (1) is the dominant photodissociation pathway. Likewise $H_2$, HD, and $D_2$ may be produced from $H_2CO$, HDCO, and $D_2CO$, respectively. Dissociation via the radical pathways (2) and (3) tends to scramble the products, since the CO produced may come from a molecule other than the one excited selectively. There are, however, two ways of overcoming this. First, it is known that reaction (1) is indeed the dominating process when formaldehyde is excited to the low vibrational levels of the excited singlet, since the radical process has a higher threshold for reaction. Second, by introducing a hydrogen atom chemical scavenger in the system, one can terminate the radical chain and eliminate the abstraction reaction (3). At pressures above 1 torr, collision-induced dissociation (4) dominates.

Separation of $D_2$ from an $H_2CO$-$D_2CO$ mixture has been carried out. A 1:1 mixture of $H_2CO$ and $D_2CO$ at 3.0 torr total pressure in a 20-cm-long 1-cm-diameter quartz absorption cell is irradiated with frequency-doubled ruby laser light. The 3472 A light consists of 25 pulses, each with 15-nsec duration, full-width at half-maximum, and a peak power of 8 MW in a beam that fills the volume of the cell. The residual formaldehyde is frozen out at liquid $N_2$ temperature in a side arm. The hydrogen isotopes thus produced are analyzed by a low-resolution MS-10 mass spectrometer. As expected from previous photochemistry studies, the quantum yield of dissociation is approximately one molecule per photon absorbed. The ratio of the amounts of products formed is $H_2$:HD:$D_2$:CO = 0.5:0.2:3.3:3.9.

The interpretation of the experimental results has to based on the absorption spectra of the isotopic species of formaldehyde at 3472 A. Our excitation light source is of the order of 3-cm$^{-1}$ spectral width, so that many rotational lines are excited and proper selective excitation is not achieved. However, some degree of selection is provided by the difference in the low-resolution absorption coefficients (liter/mole cm, $\log_{10}$) of the species at that wavelength, $\epsilon \approx 1.0$ for $D_2CO$ and $\epsilon \approx 0.2$ for $H_2CO$. This explains the ratio of enrichment $D_2$:$H_2$ of about 6:1 in the products. Much better enrichment can be achieved by using a laser of narrower spectral width to excite exclusively one isotopic species. The important ratio $D_2$:HD is an indication of the relative importance of the molecular and radical processes, respectively, in dissociation. The results demonstrate that by choosing a region of small excess vibrational excitation, even at pressures where collision-induced dissociation of $S_1$ is dominating, one can nearly eliminate the undesirable radical dissociation.

The production of $D_2$ from formaldehyde demonstrates the feasibility of isotopic separation by photopredissociation. A more important application of this scheme is the extension to the production of $C^{13}O$, $C^{14}O$, and $CO^{18}$ for formaldehyde. Table I lists calculated positions of six bands in the absorption spectrum for each of these isotopic species of formaldehyde.

TABLE I

Band centers of isotopic species of formaldehyde. All frequencies are in cm$^{-1}$ for absorption from v = 0 in the ground state.

| Vibrational Assignment | H$_2$CO | H$_2$C$^{13}$O | H$_2$C$^{14}$O | H$_2$CO$^{18}$ |
|---|---|---|---|---|
| $\nu_{00}$ | 28188.0 | 28193 | 28198 | 28196 |
| $4^1$ | 28312.6 | 28318 | 28322 | 28320 |
| $4^3$ | 29135.9 | 29140 | 29146 | 29144 |
| $2^14^1$ | 29495.0 | 29479 | 29465 | 29472 |
| $2^14^3$ | 30340.2 | 30324 | 30310 | 30317 |
| $2^24^1$ | 30658.6 | 30622 | 30589 | 30604 |

The shifts in zero point energies of the two singlet states and the changes in vibrational frequency due to the reduced mass effect have been accounted for. Table I shows that vibrations that do not involve C=O stretch are blue shifted by 5–10 cm$^{-1}$, those involving one C=O quantum are red shifted by 15–30 cm$^{-1}$, and those with two C=O quanta are red shifted by 35–70 cm$^{-1}$. An inspection of the rotational structure of the absorption spectrum of H$_2$CO shows that there are a few regions 5–10 cm$^{-1}$ from the band centers where the spacing between rotational lines is ~0.5 cm$^{-1}$. Larger spacings are more plentiful farther away from the band centers. Practical isotopic separations can thus be performed by excitation of isotopic absorption lines in these gaps in the spectrum of the normal species. Chances of isotopic lines lying in these regions are high when these gaps are near the shifted isotopic band centers given in Table I.

One can estimate the amount of normal isotope excited in a region 0.2 cm$^{-1}$ from a rotational line center, which will be the typical case in a separation scheme. The natural line-width of spectral lines (pressure-broadening and predissociation lifetime) is calculated from a typical lifetime of 10 nsec to be about 10$^{-4}$ cm$^{-1}$. Assuming a Lorentzian shape for such a line, the absorption 0.2 cm$^{-1}$ away is $2.5 \times 10^{-7}$ of the absorption strength at the center. The Doppler linewidth for formaldehyde at room temperature is about 0.07 cm$^{-1}$, so that absorption at the tail of such a line profile 0.2 cm$^{-1}$ away is of the order of 10$^{-8}$ of the absorption strength at the center. The natural abundance of C$^{13}$ is 10$^{-2}$, and that for O$^{18}$ is $2 \times 10^{-3}$, so that the amounts of normal species excited could be negligible and high-purity separation should be possible. C$^{14}$ is much less abundant so that good separation may depend heavily on the presence of large gaps between rotational lines.

Production of C$^{13}$O, CO$^{18}$, and possibly C$^{14}$O and CO$^{17}$, can be carried out by selective photodissociation of formaldehyde. An ideal source would be a tunable frequency-stable laser with high average power, for example, a high-repetition-rate, frequency-double dye laser. Fortuitous atomic line coincidences may b useful. One can work with the continuum of a high-pressure lamp, frequency selected by a monochromator or by using a formaldehyde gas absorption filter in front of the separation cell. The filtering allows only light corresponding to the spectral gaps of the normal species to pass, so that isotopic enrichment is achieved in the separation cell. Actual application of such schemes requires high-resolution spectra of the isotopic formaldehydes.

The method of isotopic separation by photopredissociation demonstrated here for formaldehyde is possible for other molecules, including substituted formaldehydes such as cl$_2$CO and cl$_2$CS, c-CH$_2$N$_2$. ICl, Br$_2$ and substituted acetylenes.

Enrichment for C$^{14}$ Dating

The principle, history, and practice of C$^{14}$ dating are relatively well known. It suffices to mention that the abundance of C$^{14}$ in living matter is one part in 10$^{12}$ and that its concentration decreases a factor of two each 5,730 years after it ceases to draw CO$_2$ from the atmosphere.

The sensitivity of C$^{14}$ dating techniques is limited by the noise background of the counters which are used to detect C$^{14}$ disintegrations from a sample. Isotopic enrichment enables the C$^{14}$ from a particular specimen to be concentrated and counted in a very small counter with a much reduced background noise level. For large objects or geologic formations, orders of magnitude more C$^{14}$ could be placed in the counter. Enrichment by four or five orders of magnitude in one step can be expected from the formaldehyde photopredissociation method just described. Further enrichment can be produced by recycling. The increases in sensitivity thus achieved enable smaller and older samples to be dated.

It has been shown above that a high degree of selectivity can be achieved in the excitation of formaldehyde. Although the greatest enrichment factors may be achieved at pressures below 0.1 torr, the time and laser energy required to process many moles of sample may be impractical. For a transition with a peak absorption coefficient of 10$^{-2}$ per cm per torr of C$^{14}$ H$_2$O, a total energy flux of about 10$^{19}$ photons/cm$^2$ or 6 joules/cm$^2$ are required to convert 95% of the C$^{14}$ H$_2$O to C$^{14}$O. Since most of the carbon monoxide produced is C$_{12}$O, there are no concerns from the photochemical complications that may introduce a very small percent of isotopic scrambling. For C$^{14}$ the enrichment factor will be almost entirely determined by the selectivity of the laser excitation.

Cautious but not pessimistic estimates of conditions for separation may be illustrated by two possible sets of conditions. An enrichment of 10$^5$ at a pressure of 10 torr could be carried out in a total path length of 10$^6$ cm, using 10 joules of laser energy per mole of gas processed. The laser energy is minimal. The 10$^6$ cm cell is awkward even with one or two hundred reflections on 99.5% reflecting dielectric-coated mirrors. An enrichment of 10$^4$ at a pressure of 100 torr could be achieved with 100 joules of laser energy per mole of material and a path of 10$^4$ cm. The laser and the cell are reaching comparable sizes in this instance. Before optimum conditions for enrichment can be determined, high resolution spectra of C$^{14}$H$_2$O may need to be measured. Then excitation selectivity can be determined experimentally.

Halogen Isotope Separation

Some interesting separations of bromine and of iondine chloride for separation of bromine isotopes and chlorine isotopes are probably best explained by simply showing the equations labeled for the steps in the process which are involved, as follows:

(1)

Br$^{79}$, Br$^{81}$ separation
Br$_2$ + h$\nu$ → Br$_2$* (photoexcitation)
Br$_2$* + M → Br* + Br* + M (collision-induced dissociation)
Br* + HI → HBr* + I (chemical trapping)
I + I + M → I$_2$ + M (2)

$Cl^{35}$, $Cl^{37}$ separation
$ICl + h\nu \rightarrow ICl^*$ (photoexcitation)
$ICl^* \rightarrow I + Cl^*$ (predissociation)
$Cl^* + HBr \rightarrow HCl^* + Br$ (chemical trapping)
$Br + Br + M \rightarrow Br_2 + M$ To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for producing isotopically enriched material by photoexcitation of dissociable molecules in which at least one element is present as a plurality of isotopes, those said molecules which contain a first said isotope having a significantly greater tendency to absorb a given spectrum range of light and to be raised to an excited electronic state and to be dissociated thereby, than do those said molecules which contain a second said isotope, comprising the steps of:
   submitting said dissociable molecules to light in said given spectrum range, to cause said molecules to be raised to said excited electronic state, thereby dissociating said molecules containing said first isotope, said first isotope entering into a different stable chemical state, and
   physically separating the matter constituting said first isotope in its different chemical state from the remainder of said matter.

2. The method of claim 1 wherein other different molecules are supplied to where said molecules are dissociated, resulting in chemical reaction with the dissociated said molecules, thereby leading to said different stable chemical state.

3. The method of claim 1 wherein before the submitting step said molecules are frozen in a solid in which the dissociation products are stable.

4. The method of claim 1 wherein before the submitting step said molecules are frozen in a solid and in which upon dissociation, the dissociation products are trapped by chemical reaction with molecules of said surrounding solid.

5. A method for producing isotopically enriched material by photoexcitation of dissociable molecules in which at least one element is present as a plurality of isotopes, those said molecules which contain a first said isotope having a significantly greater tendency to absorb a given spectrum range of light and to be spontaneously pre-dissociated thereby, than do those said molecules which contain a second said isotope, comprising the steps of:
   bombarding said dissociable molecules with photons in said given spectrum range to produce a spontaneous predissociation of said molecules containing said first isotope, so that said first isotope enters into a different stable chemical state, and
   physically separating the matter constituting said first isotope in its different chemical state from the remainder of said matter.

6. The method of claim 5 wherein other different molecules are supplied to where said molecules are dissociated, resulting in chemical reaction with the dissociated said molecules, thereby leading to said different stable chemical state.

7. The method of claim 5 wherein before the submitting step said molecules are frozen in a solid in which the dissociation products are stable.

8. The method of claim 5 wherein before the submitting step said molecules are frozen in a solid and in which upon dissociation, the dissociation products are trapped by chemical reaction with molecules of said surrounding solid.

9. A method for producing isotopically enriched material by photoexcitation of dissociable molecules in which at least one element is present as a plurality of isotopes, those said molecules which contain a first said isotope having a significantly greater tendency to absorb a given spectrum range of light and to become photoexcited, thereby rendering them capable of easily being dissociated, than do those said molecules which contain a second said isotope, comprising the steps of:
   bombarding said dissociable molecules with photons in said given spectrum range, thereby placing said first isotope in a photoexcited state,
   applying an electric field to said bombarded molecules, thereby inducing the molecules thus photoexcited to dissociate so that said first isotope enters into a different stable chemical state, and
   physically separating the matter constituting said first isotope in its different chemical state from the remainder of said matter.

10. A method for producing isotopically enriched material by photoexcitation of dissociable molecules in which at least one element is present as a plurality of isotopes, those said molecules which contain a first said isotope having a significantly greater tendency to absorb a given spectrum range of light and to become photoexcited, thereby rendering them capable of easily being dissociated, than do those said molecules which contain a second said isotope, comprising the steps of:
   bombarding said dissociable molecules with photons in said given spectrum range, thereby placing said first isotope in a photoexcited state,
   applying a magnetic field to said bombarded molecules, thereby inducing the molecules thus photoexcited to dissociate so that said first isotope enters into a different stable chemical state, and
   physically separating the matter constituting said first isotope in its different chemical state from the remainder of said matter.

11. A method for producing isotopically enriched material by photexcitation of dissociable molecules in which at least one element is present as a plurality of isotopes, those said molecules which contain a first said isotope having a significantly greater tendency to absorb a given spectrum range of light and to be raised to a photoexcited electronic state rendering them capable of being dissociated, than do those said molecules which contain a second said isotope, comprising the steps of:
   bombarding said dissociable molecules with photons in said given spectrum range, thereby placing said first isotope in a photexcited electronic state,
   causing said bombarded and photexcited molecules to collide with other molecules, thereby inducing the molecules thus photexcited to dissociate so that said first isotope enters into a different stable chemical state, and
   physically separating the matter constituting said first isotope in its different chemical state from the remainder of said matter.

12. A method for producing isotopically enriched material by photoexcitation of formaldehyde in which hydrogen is present as a plurality of isotopes, those said molecules containing deuterium having a significant tendency to absorb light at 3472 A preferantially and being dissociated thereby, comprising the steps of:

directing a laser beam of 3472 A light on gaseous formaldehyde, whereby said formaldehyde molecules containing deuterium re dissociated into $D_2$ and CO and said deuterium enters into a stable chemical state as $D_2$, and physically separating said $D_2$ from said formaldehyde and carbon monoxide.

13. A method for producing isotopically enriched material by photoexcitation of gaseous formaldehyde in which at least carbon is present as a plurality of isotopes, those molecules containing a first said isotope of carbon having a significantly greater tendency to absorb a given spectrum range of light and being dissociated thereby, than do those said molecules containing a second said isotope of carbon, comprising the steps of:

submitting said formaldehyde to a laser beam in said given spectrum range, whereby said formaldehyde molecules containing said first isotope are dissociated and said first isotope enters into a different stable chemical state as oxide of carbon, and physically separating the carbon oxide gas from said formaldehyde.

14. A method for producing isotopically enriched material by photoexcitation of gaseous formaldehyde in which at least oxygen is present as a plurality of isotopes, those molecules containing a first said isotope of oxygen having a significantly greater tendency to absorb a given spectrum range of light and being dissociated thereby, than do those said molecules containing a second said isotope of oxygen, comprising the steps of:

submitting said formaldehyde to a laser beam in said given spectrum range, whereby said formaldehyde molecules containing said first isotope ar dissociated and said first isotope enters into a different stable chemical state as oxide of carbon, and physically separating the carbon oxide gas from said formaldehyde.

15. A method for producing isotopically enriched material by photoexcitation of gaseous iodine chloride in which at least chlorine is present as a plurality of isotopes, those molecules containing a first said isotope of chlorine having a significantly greater tendency to absorb a given spectrum range of light and being dissociated thereby, than do those said molecules containing a second said isotope of chlorine, comprising the steps of:

submitting said iodine chloride to a laser beam in said given spectrum range, and in association with hydrogen bromide, whereby said iodine chloride molecules containing said first isotope are dissociated, giving free chlorine, said free chlorine then reacting with said hydrogen bromide to produce hydrogen chloride, and physically separating the hydrogen chloride from said iodine chloride.

16. A method for producing isotopically enriched material by photoexcitation of gaseous bromine in which the bromine is present as a plurality of isotopes, those molecules which are made up of a first said isotope of bromine having a significantly greater tendency to absorb a given spectrum range of light and being dissociated thereby, than do those said molecules otherwise constituted, comprising the steps of:

submitting said bromine to a laser beam in said given spectrum range, whereby said bromine molecules made up of said first isotope are photoexcited, inducing collision between said photoexcited molecules and other molecules, so that said photoexcited bromine molecules dissociate, chemically trapping said dissociated free bromine by chemical reaction with a reagent, physically separating the resulting chemically combined bromine from the molecular bromine.

17. A method for separating isotopes comprising:

impinging a beam of monochromatic light upon a chemical compound which includes at least two isotopes of one element and wherein one only of these isotopes is dissociated from said chemical compound by photoexcitation to a different electronic state from said monochromatic light, and separating said isotope from the undissociated chemical compound of the isotopes.

* * * * *

UNITED STATES PATENT OFFICE
CERTIFICATE OF CORRECTION

Patent No. 3,983,020  Dated September 28, 1976

Inventor(s) C. Bradley Moore et al.

It is certified that error appears in the above-identified patent and that said Letters Patent are hereby corrected as shown below:

Column 1, line 20, "significantly" should read -- sufficiently --

Column 2, line 31, "$UO_2cl_2$, at 4489 A" should read -- $UO_2Cl_2$, at 4489 A --.

Column 2, line 49, "isotropically" should read -- isotopically --

Column 4, line 39, after "to" insert -- be --

Column 5, line 55, "b" should read -- be --

Column 5, line 68, formula "$cl_2CO$ and $cl_2CS$, $c-CH_2N_2, ICl, Br_2$" should read -- $Cl_2CO$ and $Cl_2CS$, $c-CH_2N_2$, $ICl$, $Br_2$ --

Column 9, line 4, "3472 A preferantially" should read -- 3472 A preferentially --

Column 9, line 9, "re" should read -- are --

Column 9, line 43, "ar" should read -- are --

Signed and Sealed this

Fifth Day of April 1977

[SEAL]

Attest:

RUTH C. MASON
Attesting Officer

C. MARSHALL DANN
Commissioner of Patents and Trademarks